(12) United States Patent
Harper

(10) Patent No.: US 7,938,018 B2
(45) Date of Patent: *May 10, 2011

(54) LIQUID FLOW SENSING SYSTEMS

(75) Inventor: Alan Roger Harper, Gunnislake (GB)

(73) Assignee: GSSC, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/386,798

(22) Filed: Apr. 23, 2009

(65) Prior Publication Data

US 2010/0024566 A1    Feb. 4, 2010

(30) Foreign Application Priority Data

May 3, 2008    (GB) .................................. 0808138.2

(51) Int. Cl.
*G01F 1/56* (2006.01)
(52) U.S. Cl. .................................................... 73/861.08

(58) Field of Classification Search ............... 73/861.08, 73/1.73; 340/618
See application file for complete search history.

(56) References Cited

OTHER PUBLICATIONS

U.S. Appl. No. 12/386,798, Alan Harper, Mar. 9, 2009.*

* cited by examiner

*Primary Examiner* — Jewel Thompson
(74) *Attorney, Agent, or Firm* — Alfred A. Fressola; Ware, Fressola Van Der Sluys & Adolphson LLP

(57) ABSTRACT

A liquid flow sensing system for sensing the flow of liquid within a supply line (2) of a metering pumping machine, the system including a magnetic member (4) arranged for movement relative to a pneumatic switch (8) operated by the presence or absence of a magnetic field, the magnetic member (4) being contained within a sealed unit (5) located within the supply line (2) and the arrangement being such that, when the liquid flow rate falls below a predetermined level, the magnetic member (4) moves downwardly from a first operative position into a second operative position.

8 Claims, 3 Drawing Sheets

LIQUID FLOW SENSING SYSTEMS

FIELD OF THE INVENTION

This invention relates to liquid flow systems, and has for its object the provision of an improved form of liquid flow sensing system.

In the composites industry, the use of meter mix machines is quite common and there is an increasing requirement for a simple flow sensor for providing an indication of the flow of small amounts of liquid catalyst in such machines. There is a specific need for providing a warning signal when the flow reduces to a predetermined low flow level or ceases altogether during metering pump action.

The catalysts may be volatile and inflammable and it is a more specific object of the present invention to provide a liquid flow sensing system that does not include any electrically operated components.

SUMMARY OF THE INVENTION

According to the present invention there is provided a liquid flow sensing system for sensing the flow of liquid within a supply line of a metering pumping machine, the system including a magnetic member arranged for movement relative to a pneumatic switch operated by the presence or absence of a magnetic field, the magnetic member being contained within a sealed unit located within the supply line and the arrangement being such that, when the liquid flow rate falls below a predetermined level, the magnetic member moves downwardly from a first operative position into a second operative position.

The sealed unit containing the magnetic member is preferably located in a stainless steel vertically extending flow tube with the liquid entering the flow tube at the lower end thereof and exiting from the upper end thereof. The dimensions of the sealed unit relative to those of the vertically extending flow tube are so chosen that, for a given rate of flow of the liquid upwardly through the flow tube, a predetermined upward force is applied to the sealed unit.

The arrangement is preferably such that an alarm will be operated pneumatically when the magnetic member moves into its second operative position.

Spring means preferably acts on the sealed unit to urge it downwardly when it is in its first operative position. The spring means is preferably a compression spring.

The pneumatic switch is preferably contained within a housing that is adjustable by sliding vertically up or down around the flow tube within which the magnetic member is disposed.

DESCRIPTION OF THE PREFERRED EMBODIMENT

Figure 1:
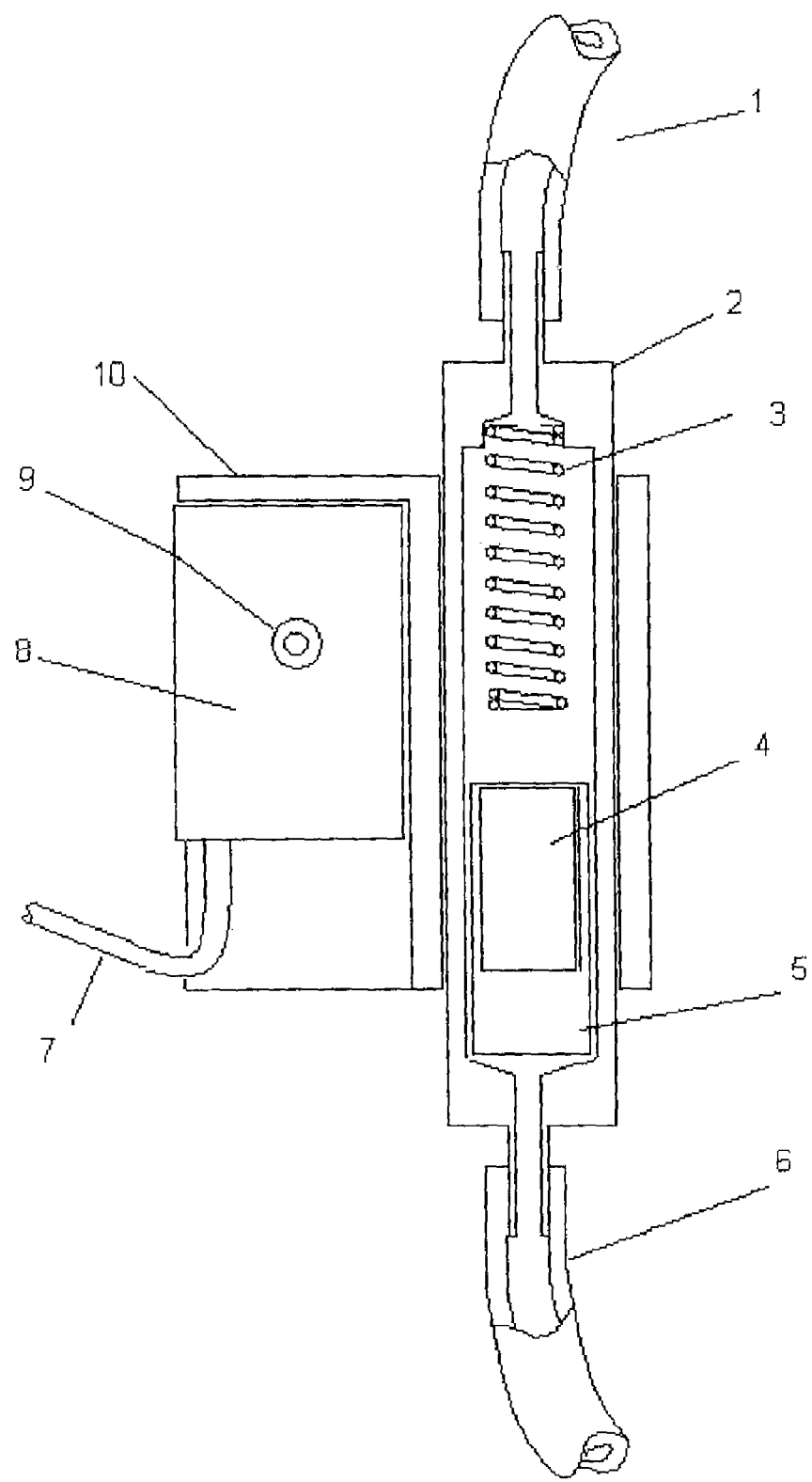
FIG. 1 is a schematic view of a device for sensing the rate of flow of liquid in the flow tube in the upward direction and for generating a signal when the rate of flow of liquid in the flow tube falls to a predetermined value.

The device shown in FIG. 1 of the drawings includes a housing 10 in the form of a machined aluminium block with a vertical hole in which a sealed stainless steel flow tube 2 is mounted. Within the flow tube 2 there is a sealed housing or slug 5 and there is a round magnet 4 fixed inside the housing or slug 5. The slug 5 containing the magnet 4 is free to move up and down within the flow tube 2 but is restricted in its upward travel by a compression spring 3. The flow tube 2 is connected at both ends to flexible tubes 1 and 6. Flexible tube 6 is the inlet tube and flexible tube 1 is the outlet tube.

The slug 5 containing the magnet 4 is a relatively close fit in the flow tube 2 and the cross-sectional dimensions of the slug 5 relative to those of the vertically extending flow tube 2 are so chosen that, for a given rate of flow of the liquid upwardly through the flow tube 2, a predetermined upward force is applied to the slug 5.

A micro pneumatic switch 8 is mounted in the housing 10 by means of a fixing screw 9 and is responsive to the presence or absence of a magnetic field. It is so positioned that it is operated when the slug 5 containing the magnet 4 moves from the position shown in FIG. 4 into the position shown in FIG. 3 as a result of a reduction in the rate of liquid flow from inlet tube 6 to outlet tube 1. Line A is the point which the top of the slug 5 containing the magnet 4 needs to reach for the switch 8 to be in its "OFF" or non-alarm condition. If the rate of liquid flow diminishes to a point such that the top of the slug 5 falls below line A, then switch 8 will be in its "ON" position so as to cause the generation of an alarm signal.

Figure 2:
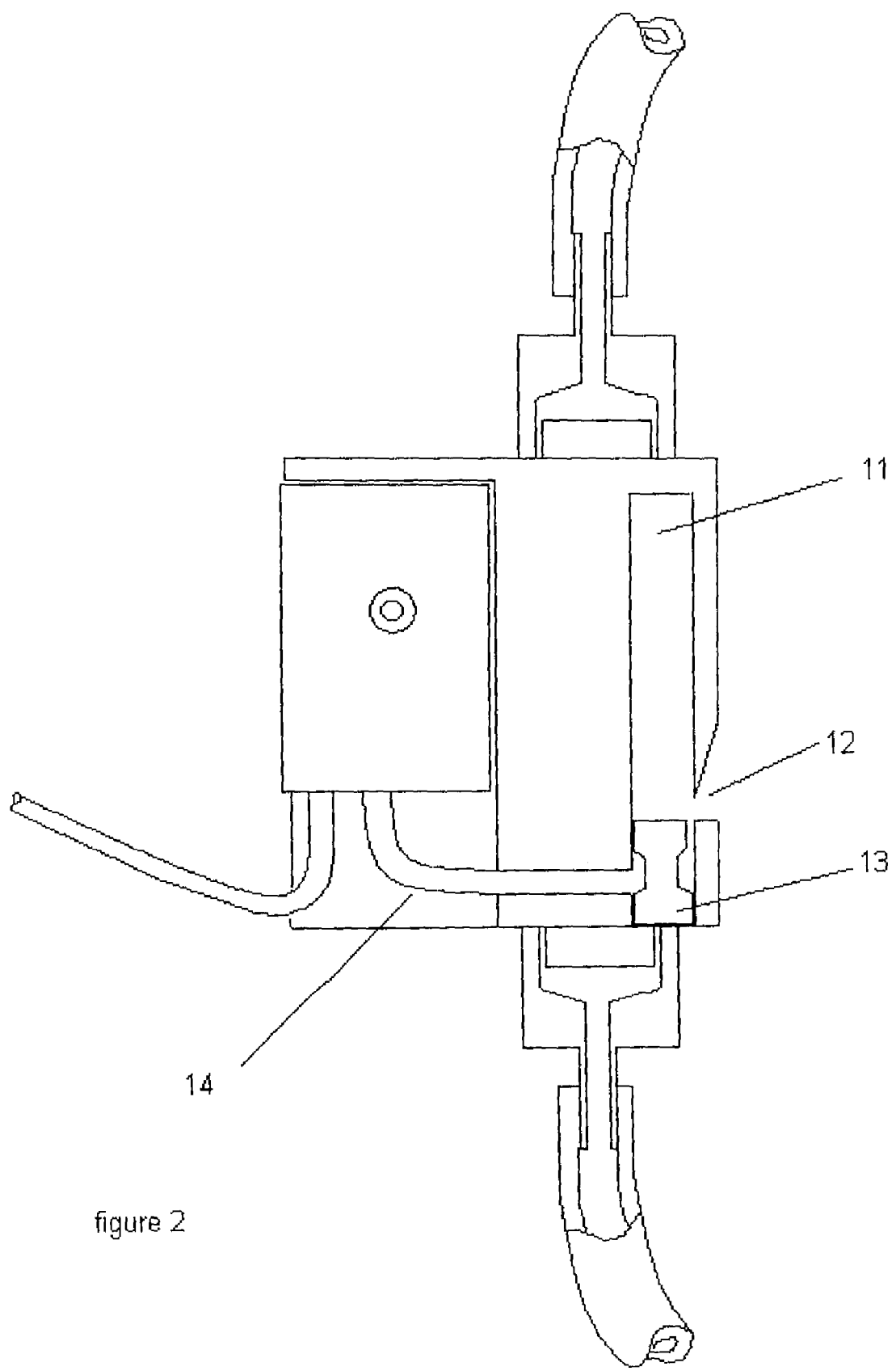
FIG. 2 shows the device of FIG. 1 in a different cross section when a signal is generated.

A second cross-sectional view of the device is shown in FIG. 2. When the switch 8 is in the ON position, that is to say when the rate of flow of the liquid through the device is insufficient to maintain the top of the slug 5 at or above the level of line A, then the micro switch 8 provides an output air signal through a tube 14. This air flow is directed to a restrictor 13 and emits into a whistle chamber 11 so as to cause the emission of a whistle sound from the orifice 12. The whistle assembly comprising the restrictor 13, the chamber 11 and the orifice 11 are built into the device housing 10 so as to form an integral part of the device.

Figure 3:
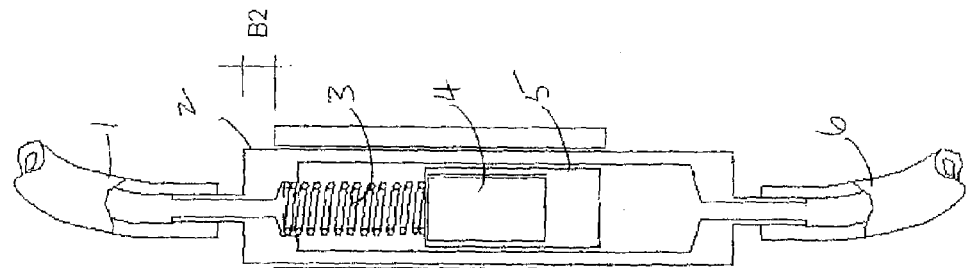
FIGS. 3, 4 and 5 show the device in three stages of operation, namely no flow, minimal flow and high flow.
Figure 4:
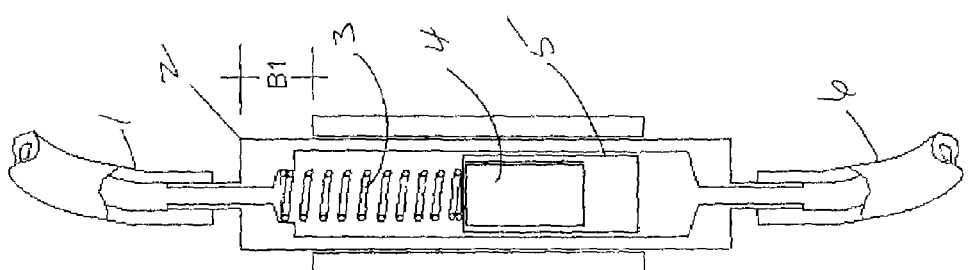

FIGS. 3 and 4 of the drawings show the relative positions of the parts of the device when it is being used for extremely low flow rate alarm conditions, for example, below circa 10 cc/min. The device is thus in its most sensitive condition.

Figure 5:
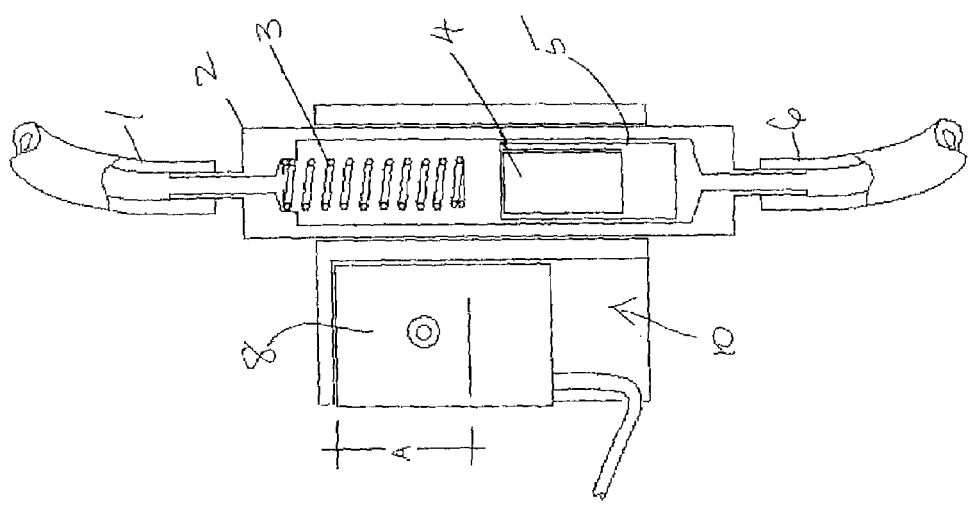

However, at higher flow rates, this degree of sensitivity is not needed and the flow sensor assembly 2, 3, 4, 5, which is positioned and held vertically as illustrated at B1 in FIGS. 3 and 4, can be repositioned within the housing 10 and moved to a new position within the housing 10 as shown in FIG. 5 and illustrated at B2. This lower position B2 of the stainless steel tube 2 and the components within it result in the device providing an alarm flow condition at or below a liquid flow of, for example, 60 cc/min as opposed to the previous position sensitivity of liquid flow values at or below 10 cc/min.

With the components of the device in the positions shown in FIG. 3, the alarm is effectively primed waiting for the liquid flow to commence and is, therefore, providing a signal causing the whistle to sound.

The space within the housing 10 permits the provision of an air whistle 12 that is connected internally to the output of the switch 8 and thus provides a built-in audible alarm. The air supply to the switch 8 is connected to the associated machine's air supply so that the switch 8 becomes live as soon as the machine is switched on.

As soon as the machine's metering pumps are set in motion, there is a short, few-second delay for the sensor to switch OFF and thus NOT alarm as, on initial start, there is insufficient flow and thus an alarm condition exists. To eliminate unnecessary start-up no-flow warnings, the machine's air supply is delayed in reaching the device for an appropriate number of seconds whilst the set flow rate is achieved on start-up or on every restart.

The output of the switch 8 has sufficient volume and pressure to operate a pressure switch or other device in addition to the built-in whistle to provide an additional low flow or no flow warning signal. This additional signal may readily be integrated into standard meter mix spray or injection or dispense machines to provide for an automatic machine stop should the operator not take the remedial required action if the alarm sounds. A delay can be introduced into the output signal of the automatic machine stop features such that any minimal spurious and intermittent alarm signals lasting under a second do not stop the machine. Thus, only an alarm condition of a few seconds duration will automatically stop the machine.

The device is so designed as to minimise the likelihood of damage as a result of liquid spills or dust and all parts that might be exposed to fumes are chemically resistant and pose no potential spark or other explosion risks.

The invention claimed is:

1. A liquid flow sensing system for sensing the flow of liquid within a supply line of a metering pumping machine, the system including a magnetic member arranged for movement relative to a pneumatic switch operated by the presence or absence of a magnetic field, the magnetic member being contained within a sealed unit located within the supply line and the arrangement being such that, when the liquid flow rate falls below a predetermined level, the magnetic member moves downwardly from a first operative position into a second operative position.

2. A liquid flow sensing system as claimed in claim 1, in which the sealed unit containing the magnetic member is located in a vertically extending flow tube with the liquid entering the flow tube at the lower end thereof and exiting from the upper end thereof.

3. A liquid flow sensing system as claimed in claim 2, in which the flow tube is made of stainless steel.

4. A liquid flow sensing system as claimed in claim 2, in which the dimensions of the sealed unit relative to those of the vertically extending flow tube are so chosen that, for a given rate of flow of the liquid upwardly through the flow tube, a predetermined upward force is applied to the sealed unit.

5. A liquid flow sensing system as claimed in claim 1, which includes an alarm which is operated pneumatically when the magnetic member moves into its second operative position.

6. A liquid flow sensing system as claimed in claim 1, which includes spring means acting on the sealed unit to urge it downwardly when it is in its first operative position.

7. A liquid flow sensing system as claimed in claim 6, in which the spring means is a compression spring.

8. A liquid flow system as claimed in claim 1, in which the pneumatic switch is contained within a housing that is adjustable by sliding vertically up or down around the flow tube within which the magnetic member is disposed.

* * * * *